United States Patent [19]
Manning

[11] 4,093,868
[45] June 6, 1978

[54] METHOD AND SYSTEM UTILIZING STEAM TURBINE AND HEAT PUMP

[76] Inventor: John I. Manning, 22 N. Grand St., Cobleskill, N.Y. 12043

[21] Appl. No.: 464,850

[22] Filed: Apr. 29, 1974

[51] Int. Cl.² .............................................. F24D 9/00
[52] U.S. Cl. ........................................ 290/2; 60/648; 237/13; 62/238
[58] Field of Search ................... 290/2; 62/238, 467; 165/45

[56] References Cited

U.S. PATENT DOCUMENTS

| | | | |
|---|---|---|---|
| 2,751,761 | 6/1956 | Borgerd | 62/238 |
| 2,778,607 | 1/1967 | Leoni | 62/238 |
| 2,982,864 | 5/1961 | Furreboe | 62/467 |

Primary Examiner—Robert K. Schaefer
Assistant Examiner—John W. Redman
Attorney, Agent, or Firm—Charles S. McGuire

[57] ABSTRACT

Discharge cooling water from the condenser of a steam turbine is pumped through the chiller of a refrigeration machine operating as a "heat pump" during heating duty, thus improving the efficiency thereof from that obtained when using water supplied to the chiller at a lower temperature. Evaporation of the refrigerant in the chiller removes heat from the water supplied thereto, whereby the water temperature is closer to that of the source from which it is taken for use in the turbine condenser.

12 Claims, 1 Drawing Figure

— STEAM, WATER OR CONDENSATE
— — — REFRIGERANT
—··—··— ELECTRICAL

U.S.Patent  June 6, 1978  4,093,868
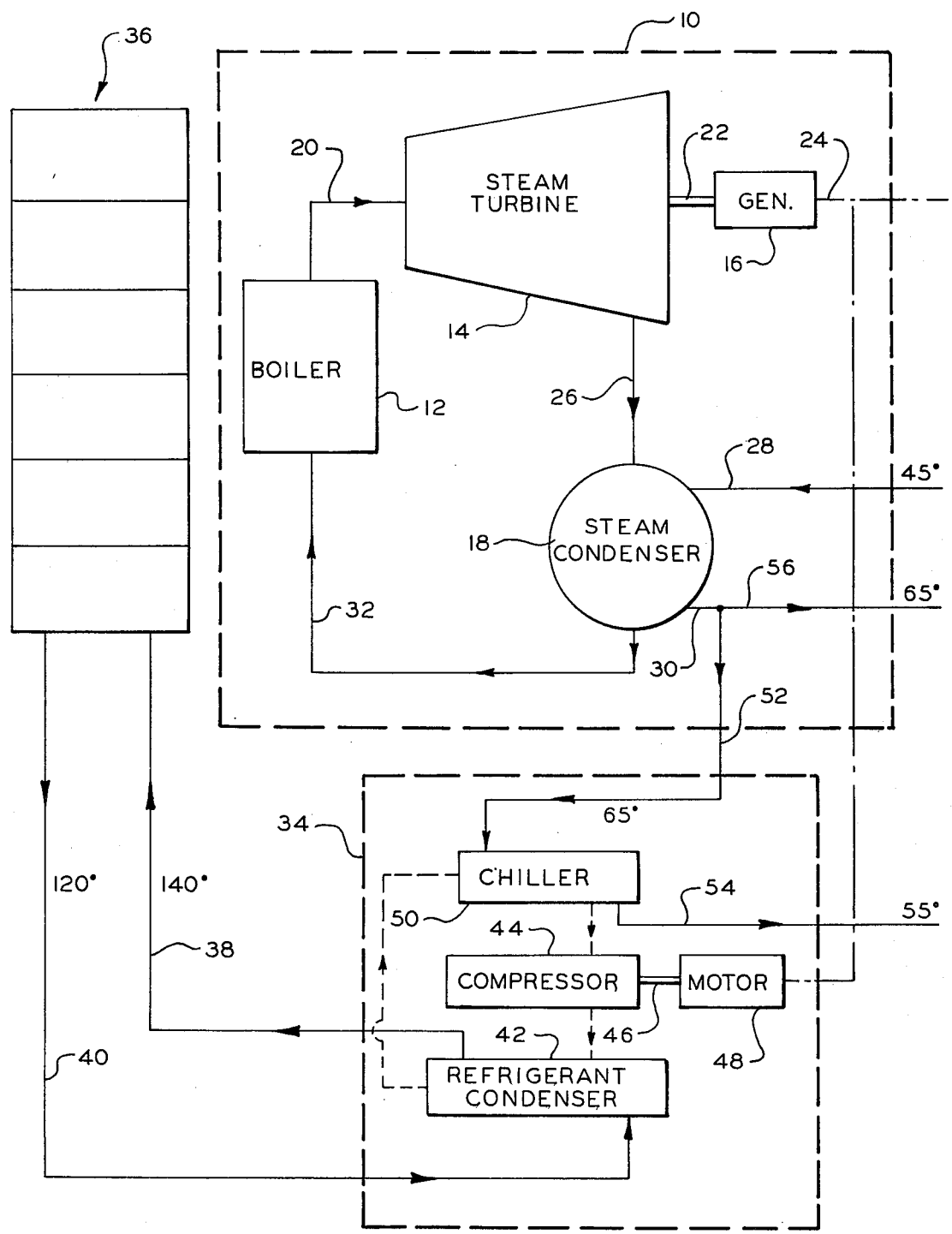

METHOD AND SYSTEM UTILIZING STEAM TURBINE AND HEAT PUMP

BACKGROUND OF THE INVENTION

The present invention relates to improvements in the operating efficiency of refrigeration equipment used in the manner of a heat pump.

The vapor compression refrigeration cycle has been used in applications which may utilize either the cooling effect produced at the evaporator or the heating effect produced at the condenser. In the second application the system is commonly referred to as a heat pump although it employs the same elements as a refrigeration system concerned only with the low temperature effect produced at the evaporator. That is, either system normally comprises a compressor, condenser, evaporator/chiller, throttling valves as well as appropriate controls and piping, the main difference being in the primary objectives of the application and the method of system operation. Commonly, the same system is utilized with the dual objectives of providing cooling during the cooling season and heating during the heating season.

When the heat pump operates as a heating system, heat is removed from the outdoor air, water or other such low-temperature heat source by evaporation of the refrigerant and delivered, together with the heat equivalent of the work of compression, to the space to be heated. Natural water supplies, such as lakes, rivers or bays, offer convenient sources from which heat may be extracted, but the amount of permissible temperature drop is often quite low. That is, during the winter months in many parts of the world, when the heat pump using a water source would be most useful as a heating system, the temperature of natural water supplies is often below 40° F. Since the water must remain above 32° F as it passes through the system before being returned to the source, the amount of heat which may be extracted is obviously quite limited. Accordingly, the heat pump using natural water sources is not commonly employed as a heating system on a wide commercial scale, other systems being more practical.

Electrical generating plants are often powered by steam turbines. A fuel is burned to provide heat to the boiler, producing steam. The energy given up by the steam as it passes through the turbine stages drives the turbine. After leaving the last stage of the turbine the steam is exhausted to a condenser where it is returned from the vapor to the liquid state. Water is circulated through the steam condenser to act as a medium of heat exchange, absorbing the heat given up by the steam during condensation.

The water used in the steam condenser may conveniently be taken from a lake, river, or other natural source, and is usually discharged back to the same source after undergoing a temperature rise in the condenser. It is not uncommon, for example, for water used in the condenser of a steam turbine generating plant to rise by 30° or more from inlet to discharge. The marine quality of many natural bodies of water has been adversely affected by "thermal pollution" resulting from the discharge of heated water from power plant condensers into natural bodies of water.

SUMMARY OF THE INVENTION

According to the present invention, a heat pump system is combined with a steam turbine generating plant to provide improved performance for each. Water is taken from a natural source at its normal, outdoor temperature for use in the steam turbine condenser. After absorbing heat in the condenser, all or some of the water discharged from the condenser is pumped through the chiller of the heat pump. The water gives up heat in the chiller as it is used to evaporate the refrigerant therein. The remainder of the water, if any, is returned directly from the steam turbine condenser to the natural source from which it was taken.

The circulation of the higher temperature condenser discharge water through the chiller of the heat pump improves the operating efficiency or coefficient of performance of the heat pump, thus providing a greater heat output for the same work input to the heat pump compressor. Also, the amount of heat which may be extracted from the water, i.e., the permissable water temperature drop, is obviously greater when water discharged from the steam condenser is used rather than water direct from the natural source.

The water discharge from the chiller is returned to the source from which the steam condenser inlet water was originally taken. Since the water is at a temperature closer to that of the natural source when leaving the heat pump chiller than when leaving the steam condenser, thermal pollution of the natural body of water is decreased or eliminated.

Principal objects of the invention are to provide a heat pump system having improved efficiency when operated in the heating mode, and to provide means for reducing thermal pollution by lowering the temperature of water returned to natural sources from steam condensers while usefully employing the heat removed from the water.

Other objects will in part be obvious and will in part appear hereinafter.

BRIEF DESCRIPTION OF THE DRAWING

The single FIGURE is a diagrammatic illustration of the general relationships of elements according to the present invention.

DESCRIPTION OF THE PREFERRED EMBODIMENT

In the drawing is indicated a generating plant for producing electricity by driving electrical generators with steam powered turbines. The generating plant includes the elements within the dotted block denoted by reference numeral 10, all of such elements being entirely conventional in construction and operation, and thus requiring no further detailed description. Included within the generating plant are boiler 12, wherein a conventional fuel is burned, or a nuclear reaction is utilized to convert water to steam, tubine 14, which is driven by the steam, electrical generator 16, and condenser 18, wherein the exhaust from turbine 14 is converted from the gaseous or vapor state back to the liquid state. Steam from boiler 12, which may be superheated and considerably above atmospheric pressure, is supplied to the inlet side of turbine 14 through line 20. The turbine which is driven by the steam is connected by output shaft 22 to the rotor of generator 16, thereby producing electrical power on line 24.

After a significant amount of the heat and pressure energy of the steam has been converted to the work output of turbine 14, the steam is exhausted from the turbine and conducted through line 26 to condenser 18, where it is condensed to the liquid state. Condensation of the steam is caused by circulating through the tubes within condenser 18 a supply of water at a considerably lower temperature than the entering steam. The cooling water is taken from a natural source, such as a lake, river or bay, or from a conventional cooling tower, and supplied to condenser 18 through line 28. After absorbing heat from the steam during condensation thereof, and thus having its own temperature elevated to some extent, the cooling water is discharged from condenser 18 through line 30. The water recovered from condensation of the steam is returned to boiler 12 through line 32.

A heat pump system is indicated generally by the elements contained within the dotted block denoted by reference numeral 34. Again, the individual elements and their manner of operation are entirely conventional and are therefore not described in detail. Although heat pumps may be used for either heating or cooling duty, the present invention is concerned solely with the former, whereby the drawing indicates that heat pump 34 is operating to provide heat to one or more buildings, or other areas to be heated, denoted generally by blocks 36. It is assumed that buildings 36 are heated by conventional hot water heat exchangers (not shown) with the heated water supplied from heat pump 34 to buildings 36 through line 38, and returned from the buildings through line 40 after giving up a portion of its heat to the space being heated.

The basic elements of heat pump 34 are refrigerant condenser 42, compressor 44, driven by output shaft 46 of electric motor 48, and chiller 50. A suitable refrigerant, of any well-known composition normally used for such purpose, is circulated through heat pump 34. For clarity and simplicity, all steam, water or condensate lines are shown in solid lines, all refrigerant circulation lines within the heat pump in dashed lines, and all electrical connections in dot-dash lines, as indicated in the legend of the accompanying drawing.

The refrigerant vapor is compressed prior to being condensed by compressor 44. The refrigerant gives up heat in condenser 42 in being converted from the vapor to liquid state, such heat being transferred to water passing through condenser 42 from line 40 to line 38. The amount of heat transferred to the water flowing through the condenser is equal to the heat absorbed in the chiller plus the heat equivalent of the work of compression. After condensation the refrigerant is circulated to chiller 50 for evaporation and the resulting gas is again compressed, and so on.

The liquid refrigerant is converted to the vapor state in chiller 50, commonly termed an "evaporator" in small scale installations, by absorbing heat from a low-temperature heat source. In conventional heat pump applications the heat source for the chiller is taken from a natural, readily available supply, such as outdoor air or water. According to the present invention, however, water discharged from steam condenser 18 is conducted through pipe 52 from generating plant 10 to heat pump 34 and circulated through chiller 50, being discharged through line 54. Depending on the capacities and flow velocities of the respective systems, all of the water from condenser discharge line 30 may be used in chiller 50, or a portion may be returned to the source through line 56. Thus, while the water used in both the generating plant and the heat pump is still taken from and returned to the same source, it is provided to the heat pump at a higher temperature than if taken directly from the source, and returned to the source at a lower temperature than if taken directly from the steam condenser, both with beneficial effects.

Some typical temperatures for operation in the manner contemplated by the invention are shown on the drawing adjacent the respective supply and discharge lines to which they apply. It is assumed that temperature of the water taken from the natural source (lake, river, etc.) and supplied through line 28 to steam condenser 18 is 45° F. The water may typically be expected to rise to a temperature of 65° by the time it is discharged through line 30. The 65° water is supplied to chiller 50, and is chilled to 55° when discharged through line 54, having given up heat in evaporating the refrigerant which may have an evaporating temperature, for example, of about 45°. The temperature of the water supplied to buildings 36 will typically be about 140° and that of the water returned about 120°. As previously mentioned, the heat added to the water in condenser 42 is that resulting from condensation of the compressed refrigerant gas and is equal to the heat absorbed in the chiller plus the heat equivalent of the work of compression.

It is readily apparent that use of water directly from the source at 45° would necessitate the use of a refrigerant which evaporates considerably below that temperature, thus lowering the coefficient of performance of the heat pump.

As an example of the improved heat pump performance provided by the present invention, the energy inputs required to achieve the same required heating duly under the aforementioned conditions with and without the present invention may be compared in the following manner:

1. Comparison of Theoretical Coeffecient of Performance(Heating)

A. Heat Source for Chiller is water discharged from natural source:
Assumptions:
    Water temperature-ambient (entering chiller) = 45° F
    Water temperature-leaving chiller = 35° F
    Refrigerant Condensing temperature — $T_c$ = 150° F (610° R)
    Refrigerant Evaporating temperature — $T_e$ = 25° F (485° R)

$$\text{Theoretical Coefficient of Performance} = \frac{T_c}{T_c - T_e}$$
$$= \frac{610}{610 - 485}$$
$$= 4.88$$

B. Heat Source for Chiller is water discharged from steam condenser
Assumptions:
    Water temperature — ambient = 45° F
    Water temperature leaving steam condenser (entering chiller) = 65° F
    Refrigerant Condensing temperature — $T_c$ = 150° F (610° R)
    Refrigerant Evaporating temperature — $T_e$ = 45° F (505° R)

$$\text{Theoretical Coefficient of Performance} = \frac{Tc}{Tc - Te}$$
$$= \frac{610}{610 - 505}$$
$$= 5.81$$

2. Comparison of Theoretical Power Required

Assumptions:
  Water temperature supply to heat pump condenser (return from buildings) — $TW_1 = 120°$ F
  Water temperature leaving heat pump condenser (supply to buildings) — $TW_2 = 140°$ F
  Water flow rate — 1000 GPM
  Heating Duty Required — 10,000,000 BTU/hr For Case A in which the Chiller uses water directly from a natural source.

$$\text{Theoretical Work Input} = \frac{\text{Heating Duty}}{\text{Theoretical Coefficient of Performance}}$$
$$= \frac{10,000,000}{4.88}$$
$$= 2,050,000 \text{ BTU/hr}$$

Since 1 Horsepower = 2542 BTU/hr
$$= \frac{2,050,000}{2542} = 807 \text{ Horsepower}$$

For Case B in which the Chiller uses water discharged from a steam condenser as a heat source.

$$\text{Theoretical Work Input} = \frac{\text{Heating Duty}}{\text{Theoretical Coefficient of Performance}}$$
$$= \frac{10,000,000}{5.81}$$
$$= 1,720,000 \text{ BTU/hr}$$

Since 1 Horsepower = 2542 BTU/hr
$$= \frac{1,720,000}{2542} = 677 \text{ Horsepower}$$

Thus, a saving of 130 Horsepower, or more than 16% of the originally required amount, is realized. If the actual, rather than the theoretical, coefficient of performance were used, more work input would be required in both cases, but the relative saving would be approximately the same. In many geographical areas in the winter months, the ambient temperature of natural water sources will be considerably lower than the 45° F assumed in the foregoing example. Although the heat pump using a natural water source may be impractical as a basic heating means under such conditions, no such lower limit applies in the case of the present invention since the water leaving the steam condenser will always be at an acceptably high temperature. Thus, by combining the steam generating plant and heat pump in the manner taught herein, the heat pump may be operated with an energy saving and at a level of efficiency which makes it a practical heating means and, at the same time, thermal pollution due to discharge of water into a natural source at higher than ambient temperature is substantially reduced.

What is claimed is:

1. A method of conjointly operating a steam turbine generating plant and a mechanical compression heat pump for heating duty comprising:
   (a) providing water from a source at ambient temperature to the steam condenser of the generating plant;
   (b) providing at least a portion of the water discharged from the steam condenser to the chiller of the heat pump for extraction of heat from such water by evaporation of refrigerant in the chiller;
   (c) discharging the water from the chiller back into said source;
   (d) circulating water returning from a space heating system through the refrigerant condenser, thereby raising the temperature of such water; and
   (e) circulating the water from the refrigerant condenser back to the space heating system to provide useful space heating.

2. The invention according to claim 1 wherein a portion of the water discharged from the steam condenser is discharged back into said source.

3. The invention according to claim 1 wherein the evaporating temperature of the refrigerant used in the heat pump is not less than 40° F.

4. The invention according to claim 3 wherein the heating duty of the heat pump comprises circulating through said refrigerant condenser not less than 500 gallons of water per minute and thereby raising the temperature thereof by not less than approximately 10° F.

5. The invention according to claim 1 wherein said source is a cooling tower.

6. The invention according to claim 1 wherein said source is a natural body of water.

7. A combined electrical generating and space heating system comprising, in combination:
   (a) a steam turbine generating plant including a boiler, a turbine, an electrical generator driven by said turbine, and a steam condenser;
   (b) means providing water from a source at ambient temperature to said steam condenser for circulation from an inlet to an outlet thereof to effect condensation of steam discharged from said turbine, thereby raising the temperature of said water above said ambient temperature;
   (c) a mechanical compression heat pump connected for heating duty including a refrigerant condenser, a compressor and a chiller wherein refrigerant is evaporated by absorbing heat from a fluid circulated through said chiller from an inlet to an outlet thereof;
   (d) means connecting said steam condenser outlet to said heat pump chiller inlet for supplying water above said ambient temperature as the fluid circulated through said chiller;
   (e) means for circulating the water returning from a space heating system through said refrigerant condenser, thereby raising the temperature of such water; and
   (f) means for circulating the water from the refrigerant condenser back to the space heating system to provide useful space heating.

8. The invention according to claim 7 wherein said source is a natural body of water.

9. The invention according to claim 8 and further including means connecting said heat pump chiller outlet for discharge of the water circulated through said chiller into said source.

10. The invention according to claim 7 and further including means connecting said steam condenser outlet for discharge of at least a portion of the water circulated through said steam condenser into said source.

11. The invention according to claim 9 and further including means for selectively controlling the proportions of water from said steam condenser outlet supplied to said heat pump chiller and discharged into said source.

12. The invention according to claim 7 wherein said source is a cooling tower.

* * * * *